March 11, 1941. F. C. ELLIS 2,234,430
GALVANOMETER
Filed April 9, 1938 4 Sheets-Sheet 1

INVENTOR.
Francis C. Ellis
BY: Cox & Moore
ATTORNEY

March 11, 1941.  F. C. ELLIS  2,234,430
GALVANOMETER
Filed April 9, 1938  4 Sheets-Sheet 2
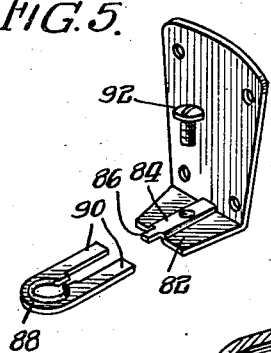
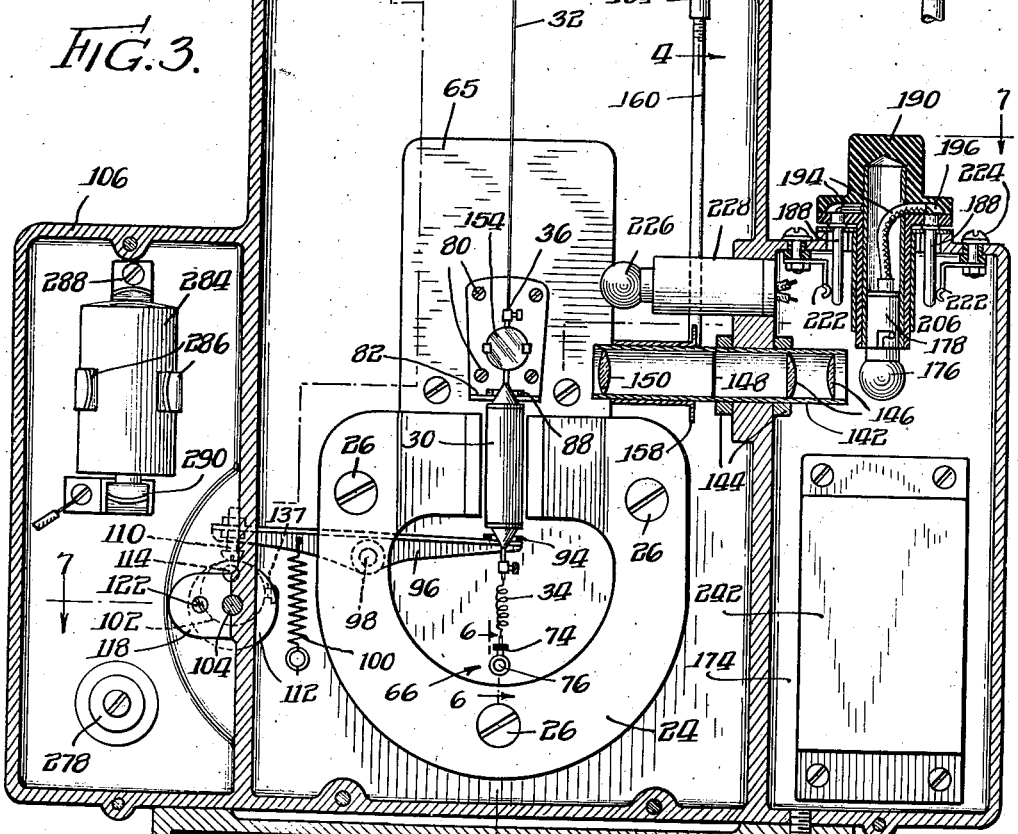
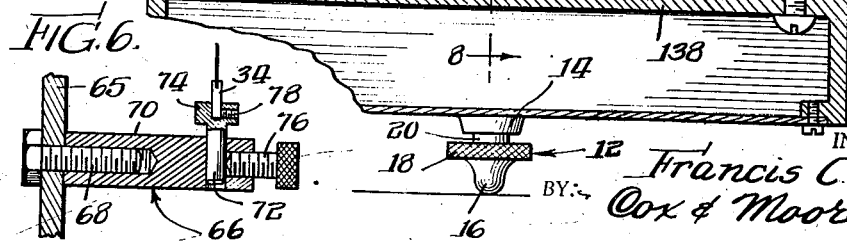
INVENTOR.
Francis C. Ellis
BY Cox & Moore
ATTORNEYS March 11, 1941.  F. C. ELLIS  2,234,430
GALVANOMETER
Filed April 9, 1938   4 Sheets-Sheet 3
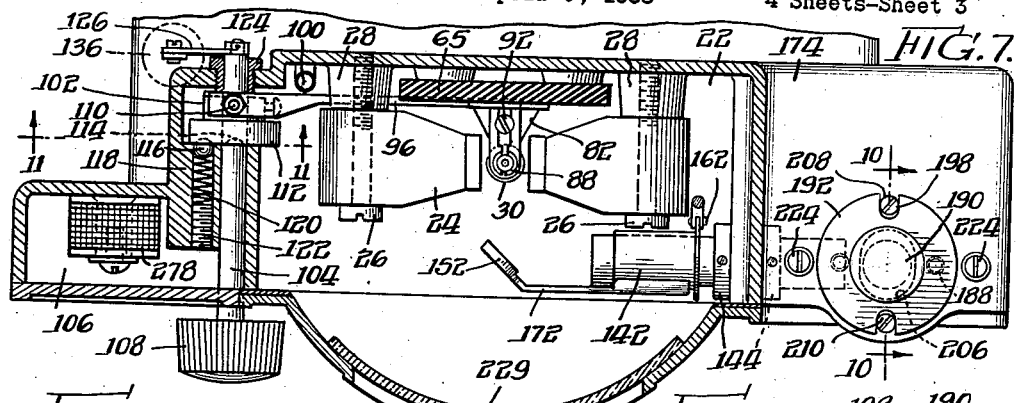
FIG. 7.
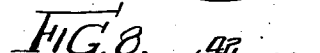
FIG. 8.
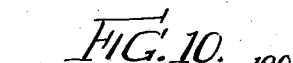
FIG. 10.
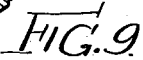
FIG. 9.
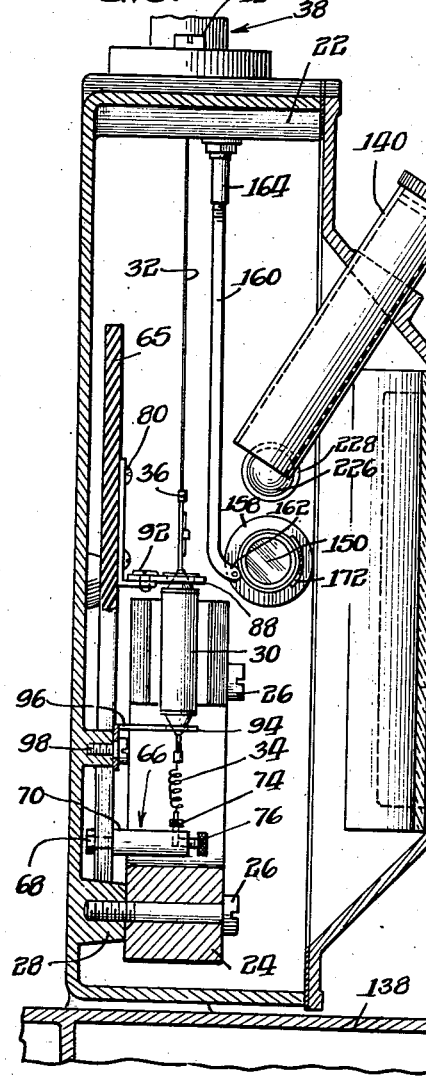
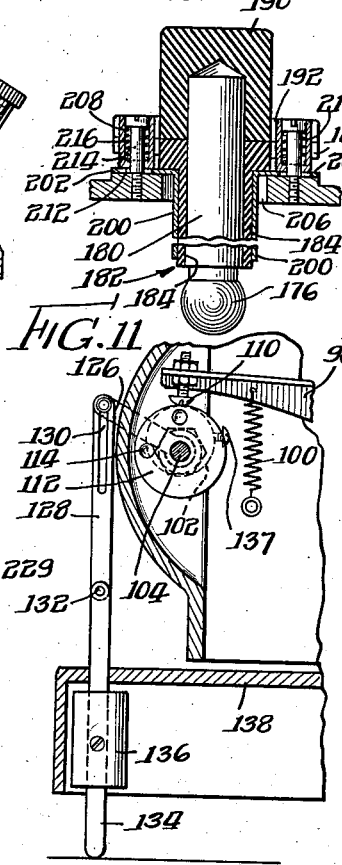
FIG. 11.
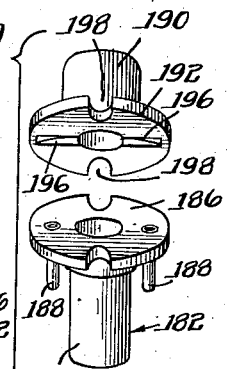
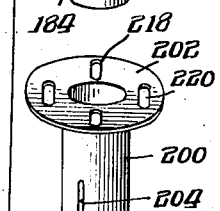
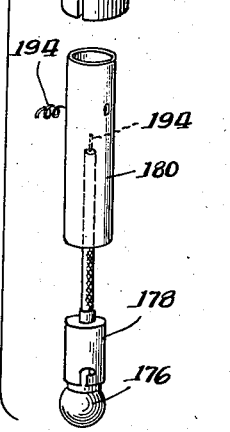
INVENTOR.
Francis C. Ellis
BY Cox & Moore
ATTORNEYS March 11, 1941.  F. C. ELLIS  2,234,430
GALVANOMETER
Filed April 9, 1938  4 Sheets-Sheet 4
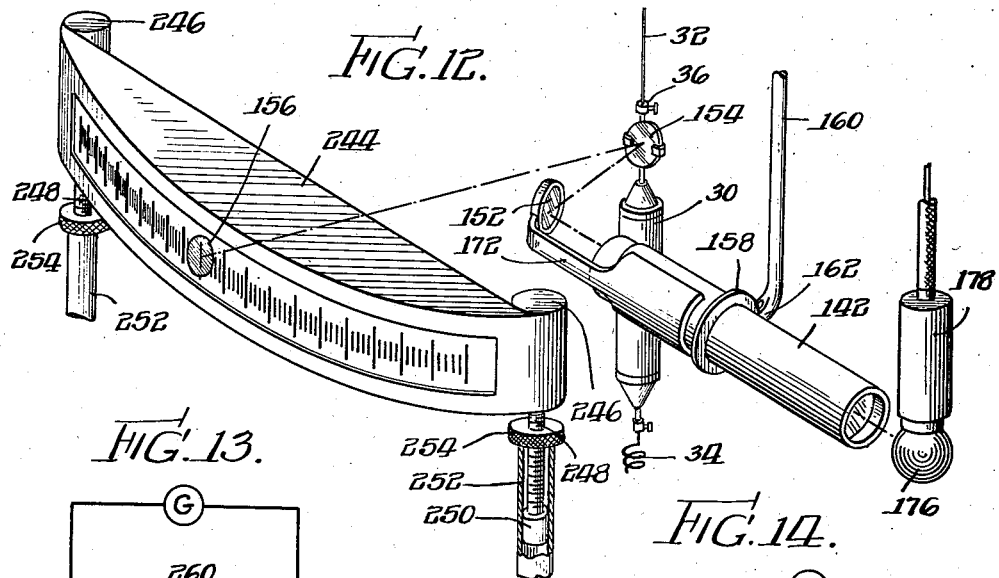
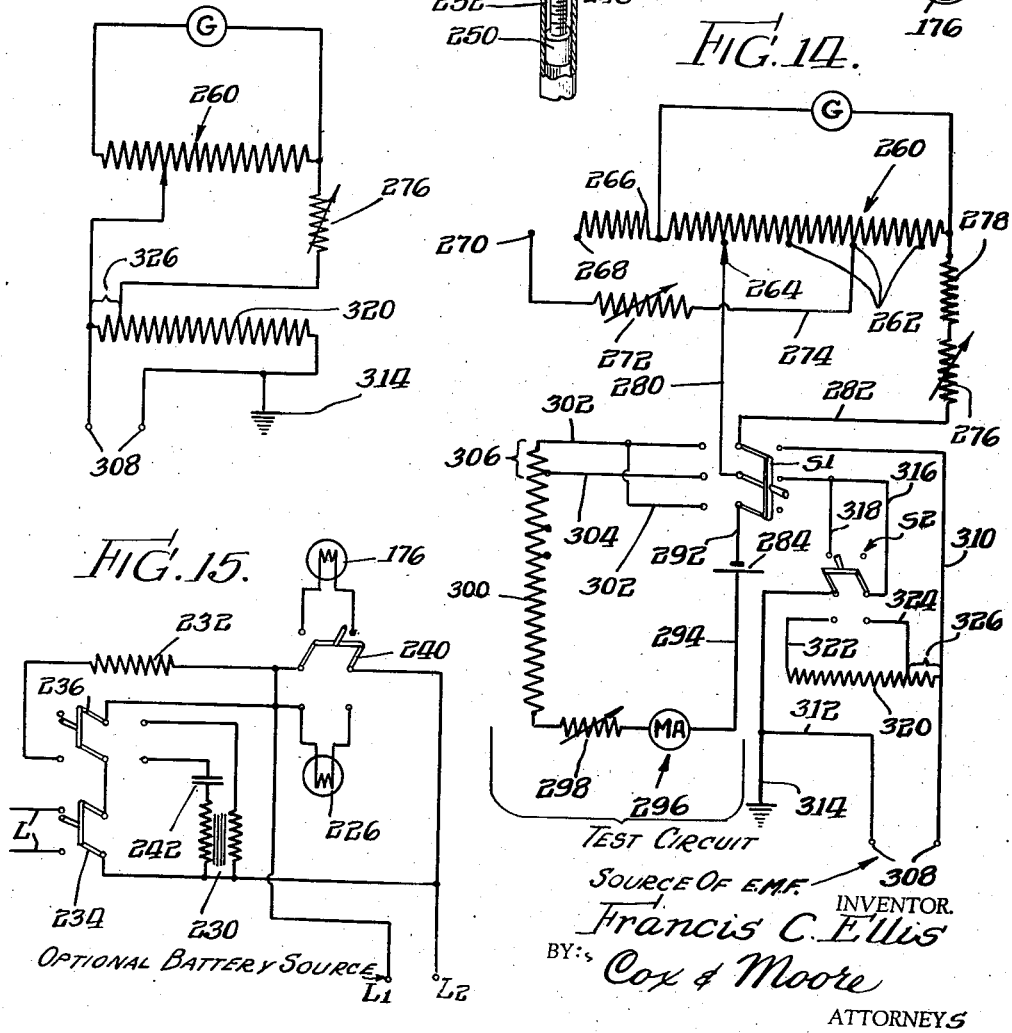
INVENTOR.
Francis C. Ellis
BY Cox & Moore
ATTORNEYS Patented Mar. 11, 1941

2,234,430

UNITED STATES PATENT OFFICE 2,234,430

GALVANOMETER

Francis C. Ellis, Chicago, Ill.

Application April 9, 1938, Serial No. 201,080

21 Claims. (Cl. 171—95)

The present invention relates to a measuring instrument and more particularly to a high sensitivity galvanometer.

Electrical current measuring means of extremely high sensitivity have heretofore comprised relatively complex structures which were extremely difficult to operate and repair and in general required the services of a highly skilled person. Moreover, the bulk and weight of the instruments hitherto known in the art in general seriously impeded their transportability and rendered it impractical to put such instruments into service where they otherwise would be of importance.

It is, accordingly, an object of the present invention to provide an instrument of the present class which can be readily operated and repaired by the layman and which is of such size and weight that it occupies little space and may be readily transported to and set up at any desired place.

A yet further object of the present invention is to provide a precision measuring instrument of the above class in which all of the moving parts may be properly supported and locked for transportation, and in particular to provide new means wherein the movable coil and its suspensions will become automatically locked and supported against breakage as soon as the instrument is moved from its place of support.

It is a further object of the present invention to provide a new and improved lighting system for a high sensitivity galvanometer which is adapted to throw a light image on the galvanometer scale to indicate the reading of the galvanometer and in which the lighting means is completely adjustable to properly focus and aline the light rays.

An additional object of the present invention is to provide a galvanometer lighting system, as above, wherein the light supporting means is freely removable from the galvanometer and is free from any exterior wires or other attaching means whereby the lighting means may be replaced by simply removing the light supporting means and replacing it after attachment of a second lighting element.

Yet another object of the present invention is to provide a lighting system for an electrical measuring instrument wherein the light rays are adjustable in a vertical plane in order to permit accurate centering and positioning of the image vertically upon the scale, which means is readily adjustable by the operator.

A still further object of the present invention is to provide a high sensitivity electrical current measuring instrument in which the lighting means is operable either from an alternating or direct current source.

The present invention more specifically comprehends the provision of new and improved suspension supporting means for a galvanometer coil which may be readily controlled under an even and uniform tension to provide the proper zero adjustment of the instrument at any time and which are further vertically adjustable to support the coil at a predetermined point in the magnetic field.

It is another object of the present invention to provide means in combination with a lower coil suspension for rendering its suspension rotationally adjustable about its axis, which means may be secured to the suspension exteriorly of the device and then readily and adjustably attached in conducting relationship to one terminal of the galvanometer, thereby obviating the difficulty of securing both ends of the relatively delicate suspension in position in a confined space.

It is furthermore an object of the present invention to provide improved leveling means for facilitating the situating of the instrument in such a position that the aforementioned coil will hang in proper predetermined position in the magnetic field, said leveling means comprising a portion of the coil unit in combination with sighting means for centering said portion of the coil with respect to a fixed ring member.

Yet another object of the present invention is to provide a calibration circuit for a precision measuring instrument of the above type wherein a carefully calibrated resistance is employed in combination with any fixed source of direct current and a relatively insensitive current measuring device for providing an accurately predetermined current for calibration purposes.

Among further objects of the present invention are to provide a current measuring device wherein the source of current to be measured is always in a circuit of substantially fixed resistance. This circuit is affected only negligibly by changes in the resistance of the other measuring circuits, to the end that variations in resistance, imposed by the necessity for calibration, adjustment and the like, will not vary the relative results obtainable from the instrument.

Numerous other objects and advantages will more fully appear during the course and progress of the following specification.

Figure 3 is a sectional elevation taken on the line 3—3 in Figure 1.

Figure 4 is a detail sectional elevation taken on the line 4—4 in Figure 3.

Figure 5 is a perspective detail view of the upper coil centering and supporting bracket, the parts thereof being shown in disassembled relationship.

Figure 6 is a detail sectional elevation taken on the line 6—6 in Figure 3.

Figure 7 is a sectional plan view taken on the line 7—7 in Figure 3.

Figure 8 is a detail sectional elevation taken on the line 8—8 in Figure 3.

Figure 9 is a perspective view of the supporting and mounting assembly for the scale lighting lamp, the parts being shown in disassembled relationship.

Figure 10 is a detail sectional elevation taken on the line 10—10 in Figure 7.

Figure 11 is a detail sectional elevation taken on the line 11—11 in Figure 7.

Figure 12 is a detail perspective view of the parts comprising the scale lighting system, these parts being removed from the remainder of the surrounding structure in the interest of clearly illustrating the function and structure thereof.

Figure 13 is a general schematic wiring diagram of the wiring hook-up of the instrument.

Figure 14 is a more specific wiring diagram in which are represented all of the elements of the circuit and their relative interconnection.

Figure 15 is a detail wiring diagram of the electrical circuits employed in actuating the lighting means in the galvanometer.

Figure 1:
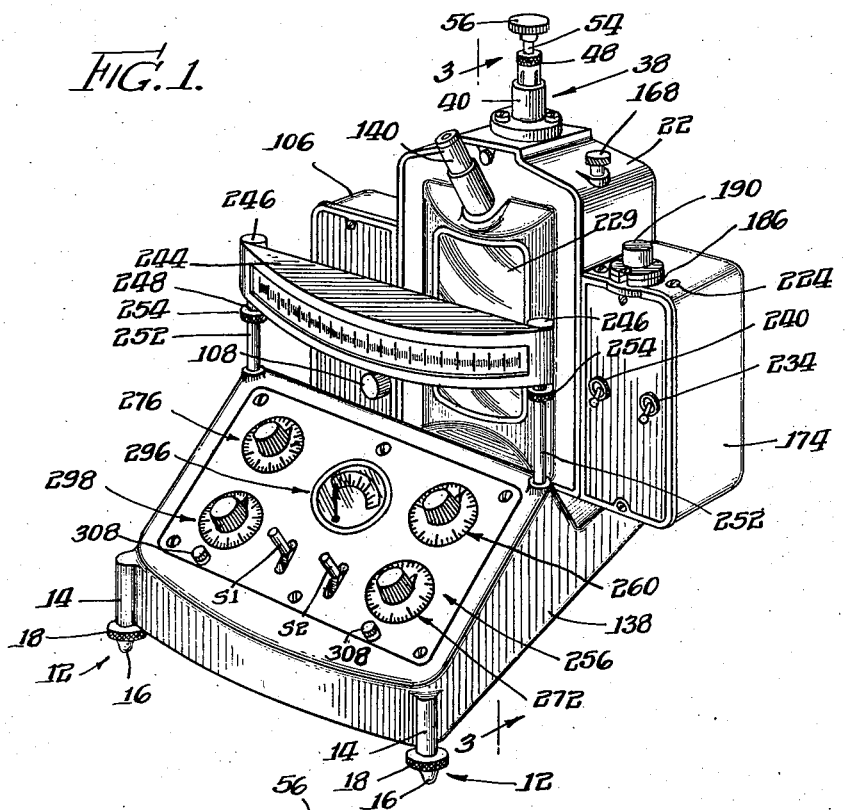
Figure 1 is a front perspective view of a measuring instrument constructed in accordance with the present invention.

The preferred embodiment shown herein for the purpose of illustrating the present invention, comprises in general a casing indicated by the reference numeral 10 and three leg members 12 which are adjustably mounted in suitable embossments 14 on the casing. The leg members comprise a lower rounded foot portion 16, a knurled handle portion 18 and a threaded rod 20 interengaging with mating threads on the interior of an aperture (not shown) in the embossments 14. It will be apparent that, since three of these legs or supporting members 12 are employed, the instrument may be readily leveled with respect to a supporting table or floor by manual adjustment of the knurled handle 18.

The casing 10 comprises a rear, upstanding, central compartment 22, shown more clearly in Figures 1, 2, 3, 7 and 8, in which a galvanometer magnet 24 is supported by fastening means 26 engaging in embossments 28 (see Figure 8). A galvanometer coil 30 is supported in the magnetic field between the ends of a magnet 24 through the agency of an upper straight suspension 32 and a lower coil suspension 34. The coil 30 is substantially identical with that described in my co-pending application, Serial No. 160,282, filed August 21, 1937, in which application the details thereof are fully disclosed and claimed. The upper suspension 32 is releasably secured to the galvanometer coil unit as at 36 and is supported at its upper end by the upper suspension unit generally indicated by the reference numeral 38.

The upper suspension supporting unit 38 comprises an insulating bushing 40 rigidly secured to the top of the compartment 22 by machine screws 42 and having embedded centrally therein a conducting tube 44. The upper end of the tube is threaded as at 46 to engage the mating interior threads on the knurled clamping member 48. Attention is particularly directed to the fact that the knurled member 48 is interiorly relieved as at 50 to accommodate an annular collar 52.

A supporting and control rod 54 having an adjusting handle 56 is slidably arranged in the central bore of the tube 44 and the knurled member 48, and passes through a central aperture in the collar 52, being adjustably clamped thereto by means of a set screw 58. The upper end of the suspension 32 is rigidly secured to the lower end of the supporting rod 54 through the agency of means 60.

It is thought that it will be apparent, from the disclosure, that the weight of the galvanometer coil is supported through the suspension 32, supported in turn through the supporting rod 54 and the annular collar 52 secured thereto, the annular collar in turn resting upon the upper edge of the rigidly positioned tube 44. Rotational adjustment of the coil in the magnetic field may be accomplished by manually rotating the handle 56, uniform tension being maintained during this adjustment through the agency of the corrugated annular spring washer 62. Vertical adjustment of the coil may be had by rotating the handle 56 until the set screw 58 is opposite the aperture 64. At this point a screw driver may be inserted through the aperture 64 to loosen the set screw 58 whereupon the handle 56 and the rod 54 may be moved upwardly or downwardly.

If it should be desired to replace a broken suspension 32, it is merely necessary to loosen the set screw 58 in the aforementioned manner and to withdraw the rod 54 from the surrounding assembly. After the upper end of a new suspension has been attached thereto the rod 54 and the suspension may be reinserted through the coil suspension support 38 to the position shown and locked in proper vertical adjustment by the set screw 58. The tension on the corrugated spring washers 62 is readily adjustable by rotating the knurled clamping member 48 upon the threaded portion 46 of the tube 44.

A panel 65 is mounted interiorly of the central compartment 22 on the rear wall thereof, as shown in Figures 3, 7 and 8, for the purpose of supporting the lower suspension terminal shown in detail in Figure 6 and indicated generally by the reference numeral 66. The lower suspension terminal 66 is made of conducting material and is secured to the panel 65 by means 68 also adapted to form one electrical terminal of the suspension unit.

The lower suspension terminal 66 comprises a horizontally extending body 70 bored adjacent the end to receive the member 72 having a knurled, annular, manually engageable flange 74, as well as set screw means 76 for locking the member to the body 70. The lower end of the lower suspension 34 is inserted in a recess in the top of the member 72 and locked thereto by means of the set screw 78.

This structure considerably facilitates the assembly of the lower suspension 34 since the lower end of the suspension may be locked to the member 72 and then the latter member merely slipped freely into the aperture in the end of the body 70. In this way the lower end is held during the time the upper end of the suspension is being secured to the coil whereby to eliminate the ever present possibility of this delicate member becoming entangled or damaged.

Attention is further directed to the fact that the lower end of the suspension 34 may be rotatably adjusted about its axis by manually turning the knurled flange 74. During this time there is no possibility of breakage of the suspension since it is firmly held in position in the body member 70, as clearly shown in Figure 6. The parts may be locked in adjusted position by tightening the set screw 76. Rotational adjustment of the lower suspension in accordance with the present invention is of considerable importance in that it is essential to permit uniform and accurate readings on the instrument and to measure currents of varying direction as well as intensity.

An upper coil locking ring, shown in detail in Figure 5, is secured to the panel 65 by fastening means 80 and has an outwardly projecting flange 82 provided with an upwardly deformed central ridge 84 terminating in a tongue 86. A cooperating adjustable ring member 88 has a pair of parallel arms 90 spaced a distance sufficient to slidably engage about the ridge 84. A locking machine screw 92 threadedly engages axially of the ridge 84 so that its head extends beyond the sides of the ridge 84 and engages portions of the parallel arms 90 to clamp them securely to the flange 82. In assembled position the ring member is locked to the flange 82, as clearly shown in Figure 7, being securely positioned against displacement by the ridge 84 and the tongue 86. This arrangement permits ready removal of the coil 30 for replacement or repair purposes merely by loosening the screw 92 and sliding the ring member 88 away from its support, as shown in Figure 5, at which position the coil shaft or suspension may readily pass through the slot formed between the parallel arms 90.

A lower locking ring member 94 cooperates with the upper locking ring member 88 to permit locking and centering of the coil in the magnetic field. The lower ring member 94 is mounted on the lever 96 fulcrumed to the rear wall of the compartment 22 as at 98, being normally urged in a counter-clockwise direction about its pivot by means of the tension spring 100 to clampingly engage the coil. Release of the clamping means is effected through the agency of a cam 102 mounted on a shaft 104 extending through a side chamber 106 and exteriorly controlled by a handle 108 (see Figure 7). The end of the lever 96 is provided with an adjustable cam follower 110 which is maintained against the eccentric surface of the cam 102 through the agency of the spring 100. The cam is selectively held in coil locking or coil releasing position through the agency of a disk 112 integral with the cam and having a pair of spaced indentations 114 adapted to register with the surface of a steel ball 116 mounted in a bore 118 in the wall of the casing. The ball or detent 116 is pressed against the indented surface of the disk 112 by a compression spring 120 bearing against an adjustable threaded plug 122.

It will be noted that the rear extremity of the shaft 104, as viewed in Figure 7, is journalled in an adjustable threaded bushing 124. The bushing 124 is threadedly mounted in the rear wall of the casing so that it may be adjustably tightened to bear against the vertical face of the cam and tension it against the action of the ball or detent 116.

With the parts in the position shown in Figures 3 and 11, it will be apparent that the coil 30 is released from contact with the rings 88 and 94 and is free to rotate under the influence of currents passing therethrough. When the control knob 108 is rotated in a counter-clockwise direction so that the upper depression or indentation 114 is engaged by the detent 116, the lefthand end of the lever 96, as viewed in Figure 3, will be permitted to move downwardly under the influence of the spring 100 so that the coil is clamped between the two rings and is lifted bodily so that its weight is taken off the upper suspension.

Actuation of the locking rings to operative position is rendered automatic upon movement of the structure from its supporting base by an automatic locking actuator, shown more clearly in Figures 7 and 11. This device comprises an arm 126 rigidly secured to the end of the shaft 104 and connected to the end of the link 128 through the lost motion pin and slot connection 130. The lower end of the link 128 is pivotally secured as at 132 to the control finger 134 having a weight 136 mounted thereon and being slidably mounted in a suitable aperture in the base 138 of the device, as shown in Figure 11. The length of the finger 134 is such that it normally rests upon the surface of the supporting table when the instrument is set up for operation and, in this position, the lost motion connection 130 permits free rotation of the shaft 104 and the control cam 102 through a sufficient arc to permit selective locking or releasing of the galvanometer coil.

It will be obvious from the above disclosure, however, that should a careless operator attempt to move the instrument without locking the coil suspension, the weight 136 will cause the control finger 134 and the link 128 to drop and pull the arm 126 through an arc sufficient to actuate the cam to coil locking position. It has been found that an exceptionally severe jolt may be sufficient to release the locking means by counter-acting the tension of the spring 100 and to prevent this occurrence a locking member 137, comprising a large headed screw, is secured in the periphery of the cam 102, as shown clearly in Figure 11. When the cam is in coil locking position, the head of the member 137 will engage over the head of the cam follower 110 to lock it to the cam surface and prevent displacement.

The sighting telescope 140 is mounted in the front wall of the compartment 22 at an angle and in a position readily accessible to the eye of the operator, for the purpose of controlling the leveling of the instrument. To this end it will be noted that the axial center line of the telescope passes squarely through the axial center of the circular aperture in the ring 88. Accordingly, it has been found a simple matter to accurately control the leveling of the instrument by merely centering the central post or stem of the coil with respect to the ring 88, as viewed with the telescope 140. It will be understood that the adjustable foot portions 12 will be manually actuated until this condition is reached. According to the preferred embodiment the ring and coil stem are respectively finished in an oxidized black and a chromium finish for visual contrast.

Attention is particularly directed to the fact that in using this improved structural arrangement, the coil will always be hung in the same portion of the magnetic field, a condition which is not always attained where external leveling means are employed in view of the fact that the suspensions and supporting means might become slightly deranged in service.

The lens system for lighting the galvanometer, as shown in Figure 3, is mounted in a cylindrical barrel 142 which is rotatably journalled in the lefthand side wall of the central compartment 22 and is rigidly positioned axially by means of a pair of annular collars 144 secured to the barrel 142 and slidable against opposed faces of the said side wall. Light, from a source to be hereinafter described more in detail, passes through the pair of plano-convex lenses 146, thence through the apertured plate 148 having a hair therein so as to cast a hair-line shadow upon the galvanometer scale. The light rays thence pass through the convex lens 150 to the inclined mirror 152, Figures 7 and 12, from whence they are deflected to the galvanometer coil mirror 154 and thence to the ground glass screen or scale 156. The path of the light rays is indicated in general by the dot and dash line in Figure 12.

According to the present invention, means is provided for adjusting the position of the hair-line shadow vertically upon the scale 156 and comprises an annular flange 158 rigid with the periphery of the barrel 142. A vertical rod 160 is pivoted at 162 to the flange 158 and threadedly engages at its upper end in the tubular bushing 164. The bushing has a bearing portion 166 journalled in the upper wall of the compartment 22, as clearly shown in Figures 3 and 4, and is formed at its upper exterior end to provide a control knob 168. Lock nut means 170 serves to retain the bushing in the position shown.

It will be obvious from this disclosure that manual rotation of the control knob 168 in either direction will cause the threaded tubular portion 64 of the bushing to rotate with respect to the control rod 160 to the end that this last named rod will be displaced upwardly or downwardly in accordance with the direction of rotation, thus causing the tubular barrel 142 to rotate about its longitudinal axis. Since the mirror 152 is rigidly secured to the barrel 142 through the agency of the arm 172, it will be rotated about the same axis, thus progressively changing its angle of reflection with respect to the incident rays of light and varying the level of the hair-line image on the screen.

The source of light for the aforementioned lighting system is shown more clearly in Figures 3, 7, 9 and 10 and is mounted in the righthand rear compartment 174 of the construction, in which position any heat given off thereby cannot affect the delicate working parts. For this purpose a small electric light 176 of one and one-half candle power has been found amply adequate.

As shown more in detail in Figures 9 and 10 the electric light 176 is mounted in a conventional bayonet socket 178 which is rigidly secured in the tubular support 180 which is in turn embedded in the insulating bushing generally indicated by the numeral 182 and having a lower cylindrical portion 184 and an upper annular flange 186 in which are rigidly mounted a pair of contact prongs 188. A cap member having an upper projecting protuberance 190 adapted to form a control knob or handle terminates in a lower flange 192 adapted to be cemented or otherwise securely fastened to the upper surface of the flange 186.

It will be understood that the two conducting terminals 194 from the electric light 176 are brought upwardly through the tube 180 and are soldered to the upper ends of the contact prongs 188, suitable grooves 196 being provided in the flange 192 to accommodate them. The electric light supporting unit is provided with a pair of diametrically opposed grooves or slots 198.

The lamp supporting unit above described seats adjustably in a sleeve 200 having an annular, outwardly projecting flange 202 at its upper edge, as shown in Figures 9 and 10. It should be noted that the sleeve is split as at 204 so that it will clampingly engage the cylindrical portion 184 of the lamp supporting unit when mounted therein, as shown in Figure 10. The supporting sleeve 200 is arranged in a relatively large aperture 206 in the upper wall of the side compartment 174.

The flange 202 of the sleeve is clampingly retained against the upper surface of the top wall of the compartment by means of a pair of resiliently mounted lugs 208. The lugs comprise cylindrical, tubular members 210 having a lower wall 212 axially apertured to permit the passage of the fillister head machine screws 214.

It will be noted that the central bore of the cylindrical, tubular members 210 is sufficient to permit free passage of the head of the fillister screws and compression springs 216 are arranged in the annular space between the said head and the wall 212. Accordingly, under the influence of the springs 216, the cylindrical members 212 are at all times pressed clampingly downwardly against the flange 202 since the machine screws 214 pass through elongated slots 218 in the flange 202. The flange and the entire sleeve is relatively movable in the plane of the flange against the resilient, frictional pressure of the cylindrical clamping lugs. Elongated, relatively large apertures 220 permit the contact prongs 188 to pass therethrough, preferably providing sufficient space to prevent electrical contact.

Attention is specifically directed to the fact that the grooves or notches 198 are so proportioned and arranged as to engage about the cylindrical clamping members 210 to position the lamp supporting assembly against rotation when it is inserted into the supporting sleeve. These grooves 198, however, are sufficiently deep to permit linear movement of the entire assembly in either direction in the line of the slots. For example, after the parts have been assembled, as shown in Figures 7 and 10, the handle or knob portion 190 may be grasped and the entire assembly, including the supporting sleeve 200 may be moved, either forwardly or rearwardly, or, in other words, transversely of the end of the lens containing barrel 142 for the purpose of properly focusing the light. The parts will be held in any adjusted position through the agency of the adjustable tension of the screws 214 and the springs 216. So, also, vertical adjustment of the light may be had by merely lifting or lowering the lamp supporting assembly within the resiliently engaging sleeve 200.

Electrical contact with the prongs 188 for the purpose of supplying electrical current to the light 176 is made through the agency of spring contact members 222 insulatingly mounted on the lower surface of the top wall of the compartment 174 through the agency of fastening means 228. The spring contact members 222 must be sufficiently wide to contact the prongs 188 at all adjusted positions of the assembly.

It will be apparent that the present invention provides a lighting unit which is free from any exterior wires or connections. When it is desired to replace the light 176 it is only necessary to grasp the handle 190 and completely withdraw the assembly, at which time the lamp socket is readily accessible. The parts may be then assembled by merely re-inserting the lamp socket supporting unit into the sleeve and adjusting it until the light is properly alined and focused. It should be noted that no connections need be made or handled and that the operation is rendered so simple that no special skill is required.

A second lamp 226 extends into the compartment 22, being mounted in the socket 228 rigidly secured in the side wall of the compartment for the purpose of lighting the interior thereof during inspection as well as leveling of the instrument. The compartment 22 is provided with a curved glass front 229.

The present invention comprehends the self-actuation of these lamps from any convenient source of electrical current and to this end there is provided a transformer 230 for reducing or stepping down high alternating current voltages to those required by the lamps. A resistor 232 is also provided for the same purpose with relation to either direct or alternating current, these two units being mounted on the rear portion of the base 138, as clearly shown in Figure 2. The transformer and resistor are preferably mounted upon prong or screw bases which engage with suitable receptacles on the base casting 138 (not shown in detail) so that these members may be readily replaced in the event of failure. Current is supplied through the electric conduit L, the parts being wired, as clearly shown in the wiring diagram of Figure 15. The main control switch 234 is mounted on the front wall of the compartment 174 while the double pole double throw switch 236 is mounted on the rear portion of the base casting 138 between the resistor 232 and the transformer 230, as see Figure 2. The double pole double throw switch 240 is mounted adjacent the switch 234 and serves the purpose of selectively lighting either of the lamps 176 or 226.

Referring to the wiring diagram of Figure 15, it will be seen that, when the switch 234 is closed and the switch 236 is in the lefthand position, either direct or alternating current supplied by the leads L will be fed to the lamp control switch 240. When the switch 236 is in righthand position, as viewed in Figure 15, the transformer 230 is connected in circuit to transform alternating current from the line L for supply to the lamp circuits.

In order to prevent inadvertent damage to the transformer by application of a direct current thereto the condenser 242 is interposed in the primary circuit. The condenser 242 is mounted in the compartment 174 of the instrument, as shown in Figure 3. Electrical leads $L^1$ and $L^2$ are provided for the purpose of permitting operation of the device from a battery source of current and lead to suitable binding posts $L^1$ and $L^2$ shown in Figure 2 on the base of the instrument.

Figure 2:
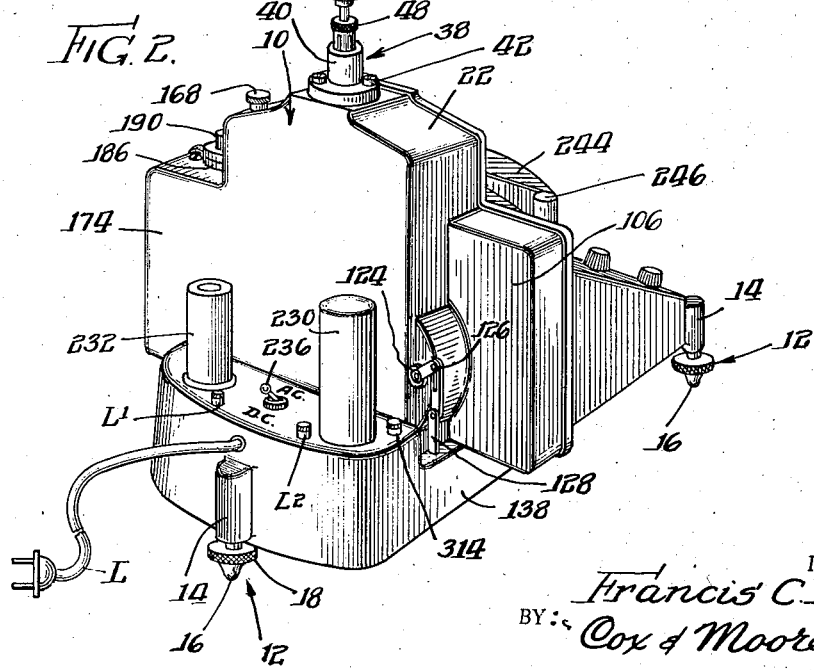
Figure 2 is a rear perspective view of the device shown in Figure 1.

The scale of the instrument comprises a translucent screen 156, hereinbefore mentioned, mounted in a scale housing 244 shown more in detail in Figures 1, 2 and 12. The ends 246 of the scale housing are rigidly secured about a pair of threaded legs or supports 248 which terminate in a cylindrical guide member 250. These legs and cylindrical guide members are arranged in a pair of vertically extending tubes 252 mounted on the base casting 138, as clearly shown in Figure 1. A knurled adjusting member 254 threadedly engages the supporting legs 248. Accordingly, the scale housing 244 may be vertically adjusted by manipulation of the knurled member 254 which normally rests directly on the horizontal upper edge of the tubes 252. For convenience in adjusting or dismantling the instrument the entire scale housing 244 may be bodily lifted out of the tubes 252 since the cylindrical portions 250 are freely slidable therein.

The forward portion of the base casting 138 is configurated to support the inclined control panel indicated generally by the reference numeral 256, interiorly of which are positioned the instruments indicated more in detail in the schematic wiring dagrams shown in Figures 13 and 14. This portion of the instrument is devoted to those units which function as ancillary to the measurement of the small electrical currents to which the present invention relates and it is a purpose of the present invention to limit all of the connecting wires carrying the so-called line currents and voltages to the compartment 174 and to the rear portion of the base and to separate this from the measuring control instruments by means of a metallic shielding partition (not shown in detail).

The inclined control panel 256 is mounted on an enlarged forward portion of the base, containing interiorly thereof the operative parts of the various instruments to be hereinafter described more in detail. It is thought unnecessary to specifically define each of these instruments in view of the fact that they individually comprise structures of well known form and construction.

Reference is made more specifically to Figure 1 and to the wiring diagram of Figure 14, where there are disclosed the various instruments and their method of electrical connection. The galvanometer control shunt 260 is connected across the galvanometer indicated by the letter G and comprises a plurality of resistance units in series, the terminals of each unit being connected to the plurality of contact points 262, adapted to be selectively contacted by the switch arm 264.

It will be understood that these resistances are such as to render the galvanometer capable of giving a wide range of readings, depending upon the setting of the contact arm 264. According to one preferred form of the invention, for example, the righthandmost resistance unit of the shunt resistance will, for example, have a resistance of 20 ohms, the next succeeding unit a resistance of 180 ohms, the third unit a reading of 1,800 ohms, the fourth, 18,000 ohms, etc. Thus, when the contact arm 264 is moved to the left, as viewed in Figure 14, the making of a circuit with each contact will increase the sensitivity of the galvanometer ten times over the previous contact point. The switch point will, accordingly, in general be moved to the left for the measurement of weak currents and to the right for the measurement of relatively strong currents.

The present invention contemplates an instrument which is, among other things, very useful in determining and measuring an electrical characteristic of a living animal organism and it has been found in this connection that, when dissimilar electrodes are applied to the surface of living animal tissue, an electrical current will pass through the circuit connecting the electrodes. It has further been found that currents of undeviating constancy flow when a relatively large series resistance is interposed in the circuit. For the purpose of enabling the measurement of this factor, a further resistance unit 266 is arranged as shown in Figure 14, being out of the shunt circuit but in series with the galvanometer when the contact arm 264 is moved in contact with its respective switch point 268.

It is contemplated that this resistance be relatively large, for example, in the neighborhood of 10 megohms, although it will be apparent that it may be varied within wide limits in accordance with the particular use in which it is to be employed. A further contact point 270, adapted to be contacted by the arm 264, connects with the variable resistance 272 which in turn is connected by the conduit 274 to an intermediate point on the shunt resistance.

The control for the variable resistance 272 is shown more clearly in the lower righthand corner of the panel, Figure 1.

Variable series resistance 276 mounted in the upper lefthand corner of the panel is in series with the galvanometer circuit shown in Figure 14, for the purpose of calibrating the instrument and adjusting the scale reading in accordance with a predetermined standard. As is well known, instruments of this kind, which are very sensitive, may be subject to some variation in service which must be compensated for by periodic comparison with known standards. So also there may be a normal slight variation in characteristics of the instruments as produced, which variation is standardized by the insertion of a suitable fixed resistance 278 in series with the variable resistance 276, it being understood that the resistance 278 will be varied in accordance with the original setting of the particular instrument.

The leads 280 and 282 of the galvanometer circuit are connected to separate poles of the triple pole double throw switch S¹ which, when thrown to the lefthand position viewed in Figure 14, connects the galvanometer to the calibration circuit while, in the righthand position, places the instrument in circuit with the source of electricity to be measured. The calibration circuit comprises a source of electrical current 284 for which an ordinary small dry cell has been found to be particularly suitable. This dry cell, as shown in Figure 3, is located in the lefthand compartment 106 of the galvanometer casing and is provided with a suitable spring clip mounting comprising opposed, resilient clipping fingers 286 and upper and lower spring contact members 288 and 290, respectively.

The cell may thus be replaced at any time by merely withdrawing it from contact with the spring fingers and inserting a fresh cell, it being understood that suitable electric conduits (not shown) in circuit with the contacts 288 and 290 extend through the casing to the forward portion of the instrument beneath the instrument panel 256. One of these conduits 292 leads to the third pole of the switch S¹ shown in Figure 14, the other conduit 294 extending to the milliammeter 296 shown in the central upper portion of the panel 256. In series with the milliammeter are the variable resistor 298 and the fixed resistor 300. The other end of the resistor 300 connects through electric conductor 302 with the topmost contact point of the switch S¹. The resistor 300 is tapped at an intermediate point by the conductor 304 which leads to the central lefthand contact point of the switch S¹.

The branch conductor 302 is further connected to the lowermost lefthand contact point of the switch. When the switch S¹ is, therefore, in the lefthand position, electrical current supplied from the cell 284 is caused to flow through the circuit comprising the milliammeter 296, the variable resistor 298, the fixed resistor 300 and the lower branch conductor 302. A relatively smaller current will, accordingly, be caused to pass through the circuit comprising the conductor 304, the tapped off upper portion of the resistor 300 designated by the numeral 306 and the galvanometer and galvanometer control circuit.

In accordance with the present invention it is contemplated that the tapped off portion 306 be of carefully predetermined value with respect to the entire resistance of the unit 300 so that the current flowing in the galvanometer circuit will bear a definite predetermined relationship to the current flowing in the circuit comprising the cell 284 and the milliammeter 296. Applicant is thus enabled to accurately adjust the current flowing in this last named circuit through the agency of the variable resistor 298 with the assurance that the current supplied in the galvanometer circuit bears a definite relation thereto. For example, if the entire resistor 300 has a resistance value of 220 ohms with the resistance of the tapped off section amounting to 20 ohms, it will be apparent that a definite E. M. F. will be imposed across the conduits leading to the galvanometer control circuit.

A pair of binding posts 308 are provided at the lower edge of the panel for connection to a source of electricity to be measured by the instrument. One of these terminals connects through the conductor 310 with the top righthand contact point of the switch S¹, the other terminal being connected with the conductor 312 which is grounded as at 314 and connects with one of the blades of the double pole double throw switch S².

The other blade of the switch S² is connected by conductor 316 to the central righthand contact member of the switch S¹. The upper lefthand contact member of the switch S² connects through the conductor 318 with the same point. When the switch S² is thrown to the uppermost position, as viewed in Figure 14, with the switch S¹ closed to the right, a circuit will be completed across the terminals 308 through the conductor 312 and the switch S² to the conductor 318 and the central pole of the switch S¹ in the galvanometer circuit, the return lead of the circuit being completed by the conductor 282 of the galvanometer circuit, the upper blade of the switch and the conductor 310.

The instruments constructed in accordance with the present invention are adapted to permit the interposition of a relatively constant resistance in circuit with the source to be measured regardless of the particular setting of the calibrating series resistance or the other control resistances in the galvanometer circuit. In other words, it has been found that, as the resistance 276, for example, is varied in accordance with the calibration of the instrument or the particular purpose for which the instrument is used, the resistance in circuit with the terminals 308, accordingly, is varied.

The source of electricity to be measured in some instances may vary in characteristics in accordance with the circuit in which it is placed. When measuring the current produced by the electrolytic action of living animal tissue, it has been found desirable to assure the interposition of a relatively constant series resistance so that the readings obtained at different times under different circumstances will be comparable. To this end, the present invention provides a shunt in-put circuit comprising the resistor 320 which connects at one end to the conductor 310 and at its other to the conductor 322 leading to the lower lefthand contact of the switch S². The conductor 324 from the righthand lower contact of the switch S² taps off a portion of the resistance 320, the tapped off portion being indicated by the numeral 326.

When the switch S² is thrown to lowermost position, as viewed in Figure 14, the source of current to be measured will be in circuit with the conductor 310, the entire resistance 320, the conductor 322, the lefthand blade of the switch S² and the conductor 312. The resistance 320 will obviously be fixed regardless of the setting of the other instruments. The galvanometer will be interposed in and will derive its current from the circuit comprising the conductor 310, the tapped off portion 326 of the resistor, the conductor 324, the righthand blade of the switch S² and the conductor 316, it being understood that the conductors 310 and 316 are in series with the galvanometer circuit through the medium of the switch S¹.

It will be seen from the above that, with the shunt in-put circuit as shown, any variations in the resistance of the galvanometer circuit will produce only a relatively small variation in the in-put circuit. For example, according to one preferred form, the resistor 320 may have a resistance value of 10,000 ohms, whereas the tapped off portion 326 will have a resistance of 200 ohms. In use, therefore, the resistance changes between the steps or points of the galvanometer shunt circuit produce a change in the in-put circuit in the ratio of 200 to 10,000 or amounting to only 2% of the total resistance change in the galvanometer circuit. In other words, if the total resistance of the galvanometer circuit were reduced to zero, it would result in only a 2% change in the in-put circuit and for this reason the resistance in the circuit being measured, is virtually independent of variations in the calibration resistance or in other of the variable resistances of the instrument.

The circuit diagram shown in Figure 13 is the same as the circuit shown in Figure 14, but is schematic in character, being simplified for the purpose of illustrating the relative arrangement of the in-put shunt as well as the galvanometer control shunt.

In use, the instrument is first placed upon a suitable supporting surface and leveled through the agency of the knurled adjusting seat 12 until the top of the coil 30 is centered within the ring 38, as viewed through the sighting glass or telescope 140. It will be understood from the above disclosure that the galvanometer coil 30 will be first released by rotating the control knob 108 to the right, as viewed in Figure 1.

After grounding the binding post 314, the electrical lead L is plugged in a suitable source of electric current or, if desired, the current may be derived from a battery by connecting the leads of the battery to the binding posts L¹ and L². If, for example, the lead L is connected with a source of direct current, the switch 236 on the rear of the instrument will be actuated to the position indicated by the letters DC, placing the resistance 232 in circuit. If a source of alternating current is used, the switch 236 is thrown to the opposite position so that the transformer 230 may be placed in the circuit. After the main control switch 234 on the front of the casing is closed, the switch 240 may be actuated to place either of the lamps 176 or 226 in circuit.

Calibration is accomplished by illuminating the lamp 176 to project a ray of light through the lens barrel 142 and upon the angularly arranged mirror 152 to the reflecting mirror 154 on the galvanometer coil and thence to the scale 156. The hair-line image will be centered upon the scale by rotating the knurled control handle 168. The illuminating lamp 176 will be adjusted to produce a sharp image by grasping the knob or handle portion 190 to elevate the entire assembly and/or adjust it in a transverse plane, as hereinbefore mentioned.

The switch S¹ is then closed to the left position, as viewed in Figure 14, and the variable resistance 298 adjusted to produce a predetermined reading upon the milliammeter corresponding to a desired current flow in the galvanometer circuit and the galvanometer reading carefully noted. The variable resistance 276 may be adjusted to position the galvanometer in accordance with a predetermined standard. If necessary at this time the upper suspension control handle 56 may be angularly adjusted to set the zero point.

In using the instrument for electrical measuring purposes the binding posts 308 are connected to a source of electricity to be measured at which time the switch S² may be in either operative position. The galvanometer may be actuated in a known manner to determine the characteristics of the electrical current flowing in the circuit.

It has been found, according to the present invention, that the switch S² is preferably actuated to throw the in-put shunt 320 into circuit when the currents to be measured are relatively large, in view of the fact that, with only a relatively small resistance in series with the galvanometer, the damping characteristics thereof may vary in an undesirable degree.

The present invention provides a high sensitivity electrical current measuring instrument which is portable to a high degree and capable of use in situations which would be unfavorable to high sensitivity instruments now in use. The present galvanometer may be set up at substantially any point and be promptly used to make electrical measurements with the highest degree of accuracy and dependability. All of the necessary adjustments and calibrations can be made by an unskilled operator and any necessary replacement of parts will be effected by a few simple steps. For example, should the instrument be inadvertently moved without rotating the control knob 108 to lift the coil from its suspension, automatic means comes into action to produce this effect and prevent damage to the delicate elements of the structure.

As hereinbefore mentioned, the present invention finds particular utility in the examination of inflamed or otherwise abnormal tissue areas. When used in this manner, dissimilar electrodes are connected to the terminals of the instrument, namely, the binding posts 308, and are contacted at spaced points with the surfaces of the tissue of the animal organism. Under these circumstances, electrical current is caused to flow in the galvanometer circuit which has been found to vary in accordance with the variations in conductivity of the intervening tissues. The use of the in-put shunt resistance has been found to permit accurate relative comparison of the condition of different organisms at all times.

It will be understood that the use of the instrument of the present invention in the examination of animal tissue is purely illustrative and that the instrument may be used in general in any situation wherein it is desired to measure or to otherwise determine the characteristics of an electrical current or charge.

Changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. In a combination with a galvanometer comprising a magnet and a coil rotatably arranged in said magnetic field, suspension means for the coil, means for angularly adjusting the suspension with respect to the axis of the coil, means for lifting the coil off its suspension when in disuse, cam control means for actuating the lifting means, and interlocking means associated with the cam and adapted to engage the lifting means and lock said lifting means in coil engaging position whereby to positively maintain the coil in supported position at all times.

2. In combination with a galvanometer comprising a coil arranged in a magnetic field and having suspension means therefor, means adapted to lift the coil off its suspension when in disuse, means for actuating said lifting means into interengagement with the coil, yieldable means for urging the lifting means into coil engaging position, means for actuating said coil lifting means away from coil engaging position, and interlocking means associated therewith for positively interengaging the lifting means against vertical movement in coil engaging position whereby to maintain the coil positively in supported position.

3. In combination with a galvanometer comprising a magnet and a coil rotatably arranged in said magnetic field, suspension means for the coil, lever means for engaging the coil and clamping it in a position where it is lifted from the suspension, cam control means for actuating said lever to coil engaging and coil releasing positions, detent means retaining said cam in a plurality of operative positions, and interlocking means operatively associated with the cam to engage the lever for locking the lever in coil engaging position.

4. In combination, a galvanometer comprising a magnet for creating a magnetic field, a coil rotatably suspended in said magnetic field, suspension means for supporting the coil in said magnetic field, and means to support the galvanometer in operative position, locking means for engaging the coil and supporting the coil with respect to the suspension during periods of disuse, and means automatically operable to actuate the locking means when the assembly is moved from operative position whereby to positively engage the coil at all times when the instrument is moved from said operative position.

5. In combination with a galvanometer comprising a coil movably mounted on suspension means, locking means for engaging the coil and supporting the coil with respect to the suspension during periods of disuse, means automatically operable to actuate the locking means when the assembly is moved from operative position whereby to positively engage the coil at all times when the instrument is moved from said operative position, and manual control means associated with said automatically operable means and operable to control the locking means when the assembly is located in operative position.

6. In combination, a galvanometer comprising a magnet for creating a magnetic field, a coil rotatably suspended in said magnetic field, suspension means for supporting the coil in said magnetic field, and means to support the galvanometer in operative position, locking means for engaging the coil and supporting the coil with respect to the suspension during periods of disuse, means automatically operable to actuate the locking means when the assembly is moved from operative position whereby to positively engage the coil at all times when the instrument is moved from said operative position, said automatic means comprising a supporting member having a contact portion adapted to be supported when the galvanometer is arranged in operative position and movable to actuate the locking means when the assembly is shifted, control means for actuating the coil engaging means to a position to lift and lock the coil, and a lost motion connection between said supporting member and the control means whereby the control means is movable when the galvanometer is mounted in operative position upon a supporting means.

7. In an instrument of the class described comprising a galvanometer having a magnetic field and a coil suspended in the field, clamping means adapted to engage and support the coil when in disuse, said clamping means comprising a clamping member adapted to engage a portion of the coil, a supporting bracket for the clamping member, said clamping member having spaced supporting portions providing a passageway therebetween, and releasable interconnecting means for securing the said supporting portions in fixed, predetermined position upon the supporting bracket.

8. In an instrument of the class described comprising a galvanometer having a magnetic field and a coil suspended in the field, clamping means adapted to engage and support the coil when in disuse, said clamping means comprising a clamping member adapted to engage a portion of the coil, supporting means for the clamping member, said clamping member terminating in spaced arms providing a passageway therebetween and releasable interconnecting means on the supporting means and having a portion adapted to engage the clamping member adjacent said passageway for closing the passageway and for securing the said arms in fixed, predetermined position upon the supporting means.

9. In an instrument of the class described adapted to be arranged upon a suitable support, comprising a galvanometer having a magnetic field and a galvanometer coil assembly comprising a coil arranged in said field and coil suspension means therefor, means for adjusting the angular position of the instrument with respect to said support for controlling the vertical position of said coil within the magnetic field, means for locating the coil in predetermined operative position in the field comprising a fixed member engaging about a portion of the coil assembly but spaced therefrom for centering the coil centrally thereof, and sighting means directed toward said fixed member and disposed to disclose the relative position of the coil with respect to said fixed member.

10. An instrument of the class described adapted to be arranged upon a suitable support, comprising a galvanometer having a galvanometer coil assembly comprising a coil and coil suspension means, means for adjusting the angular position of the instrument with respect to the support for controlling the location of the coil within the instrument, means for locating the coil in predetermined operative position comprising a ring substantially embracing a portion of the coil assembly but normally spaced therefrom, and sighting means directed toward the plane of said ring and toward the central axis thereof to visually disclose the position of the coil with respect to the ring.

11. In a galvanometer comprising a frame and a galvanometer coil suspended in a magnetic field, said coil being provided with a reflecting mirror, a screen in juxtaposition to the mirror for indicating the reading of the galvanometer, an illuminating system comprising a source of light, light directing means for transmitting illumination from the said light source, said light directing means comprising means for bending a ray of light and directing it towards said mirror, means to control the position of the reflection on the scale comprising a rotatable mounting for said light bending means, and means to rotationally adjust the said light bending means with respect to its mounting.

12. In a galvanometer comprising a frame and a galvanometer coil, said coil being provided with reflecting means adapted to direct a reflected image upon an indicator screen, an illuminating system comprising light directing means for transmitting illumination from a light source, said light directing means comprising means for bending a ray of light and directing it toward said reflecting means, and means to control the position of the reflection on the screen comprising means movably mounting said light bending means, and means for angularly adjusting said light bending means with respect to its mounting.

13. In a galvanometer comprising a frame and a galvanometer coil suspended in a magnetic field, said coil being provided with a reflecting mirror, a screen in juxtaposition to the mirror for indicating the reading of the galvanometer, an illuminating system comprising a source of light, a lens barrel rotatably mounted in the frame, means for projecting an image on the screen to indicate the reading of the galvanometer, and comprising a reflector mounted on the barrel and adapted to direct light therefrom at an angle to the axis of the barrel, and means to rotatably adjust the position on the barrel to determine the position of the reflection on the screen.

14. In a galvanometer comprising a frame and a galvanometer coil suspended in a magnetic field, said coil being provided with a reflecting mirror, a screen in juxtaposition to the mirror for indicating the reading of the galvanometer, an illuminating system comprising a source of light, a lens barrel mounted in the frame, means for projecting an image on the screen to indicate the reading of the galvanometer, and comprising a reflector mounted on the barrel and adapted to direct light therefrom at an angle to the axis of the barrel, said reflector being mounted for rotation about an axis substantially coincident with the axis of said lens barrel, and means to rotatably adjust the position of the reflector about its axis to determine the position of the reflection on the screen.

15. A galvanometer comprising a galvanometer coil mounted in a magnetic field, a casing for the galvanometer, means associated with the casing for directing a beam of light to the scale of the instrument, a source of illumination for said light directing means comprising a lamp, mounting means for said lamp adapted to support the lamp within the casing and having a manually actuable portion projecting exteriorly of the casing, the mounting means being removably supported in the casing, and contact members on the mounting means and adapted to engage contact members on the casing for supplying current for energizing the lamp.

16. A galvanometer comprising a galvanometer coil mounted in a magnetic field, a casing for the galvanometer, means associated with the casing for directing a beam of light to the scale of the instrument, a source of illumination for said light directing means comprising a lamp, a lamp supporting socket for the lamp, and receiving means for the socket and resiliently engaging the socket whereby the socket may be adjustably moved axially thereof, said receiving means having a flange extending therefrom, the surface of the flange being resiliently contacted by clamping means and being relatively movable substantially in the plane of the said flange against the resistance of the clamping means whereby the lamp is adjustable in a plurality of transverse planes with respect to the light directing means for focusing and centering the light with respect thereto.

17. A galvanometer comprising a casing and a scale, and means associated with the casing for directing a beam of light to the scale, said lastnamed means comprising lamp supporting means on the casing, said lamp supporting means being adapted to support a lamp upon the casing for adjustment axially of the lamp and for adjustment in a plane normal to the axis of the lamp, said supporting means being operative to yieldably hold the lamp in any adjusted position whereby the lamp is adjusted in a plurality of transverse planes for focusing and centering purposes.

18. A galvanometer having a magnetic field and a coil movably mounted in the magnetic field, said parts being arranged in a vertically upstanding housing, a forwardly extending base contiguous with the lower end of said vertical housing, and a second housing disposed on said base forwardly of said first-named housing and spaced therefrom, said second-named housing having an elevation lower than said first-named housing and having a front wall inclined downwardly and providing a control panel in front of the casing, and an indicating screen on said second housing in front of said first-named housing in operative relation to indicate the angular position of said coil.

19. In a galvanometer comprising a frame and a galvanometer suspension, means for supporting said suspension comprising a support on the frame, control means rotatable in said support and being adapted to receive said suspension, flange means releasably secured to said rotatable control means and extending radially therefrom adjacent the end of said support, resilient means frictionally coacting with the flange to tension the control means, and a clamping member adjustably movable axially of said support and having flange means radially opposed to said first mentioned flange on the side opposite said support, said clamping member cooperating with said support to clamp said flange and resilient means therebetween for subjecting the control means to an adjustable resilient tension against movement in a rotational direction.

20. In a galvanometer comprising a frame and a galvanometer suspension, means for supporting said suspension comprising a support on the frame, control means in said support adapted to receive said suspension and being rotatable coaxially of said suspension, flange means releasably secured to said control means and extending radially therefrom, said flange means being supported by said support, resilient means frictionally coacting with the flange to tension the control means, and a clamping member on said support for clamping said flange and resilient means therebetween, said control means having a manual control member located beyond the clamping member, and means to adjustably release said flange from the control means for vertically adjusting the suspension.

21. In a galvanometer of the suspension coil type, comprising means for creating a magnetic field, a coil suspended in said field, and upper and lower suspensions extending oppositely from said coil, a lower connecting bracket for said lower suspension mounted upon a fixed portion of said galvanometer and extending outwardly to a point below said coil, said bracket having a socket formed therein at said point and opening upwardly, a suspension terminal member having a portion complementary to said socket and adapted to be received in said socket when vertically lowered therein, said socket supporting said terminal member for angular rotation about an axis coaxial with the axis of movement of said coil, said terminal member being freely vertically separable from said socket and having means thereon for attachment to the lower end of the lower coil suspension, a manually engageable flange portion on said terminal member above the socket engaging portion for angularly adjusting the terminal member within the socket, and means adjustable for selectively clamping said terminal member in any angular position within the socket.

FRANCIS C. ELLIS.